(12) United States Patent
Chawda et al.

(10) Patent No.: US 11,682,287 B2
(45) Date of Patent: **\*Jun. 20, 2023**

(54) AIRFIELD LUMINAIRE VIBRATION MONITORING

(71) Applicant: Honeywell International Inc., Charlotte, NC (US)

(72) Inventors: Nipun Kumar Chawda, Bangalore (IN); Ramalingam Pavadai Nallur, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,825

(22) Filed: Jan. 5, 2022

(65) Prior Publication Data
US 2022/0130226 A1    Apr. 28, 2022

Related U.S. Application Data

(63) Continuation of application No. 17/190,953, filed on Mar. 3, 2021, now Pat. No. 11,227,478.

(30) Foreign Application Priority Data

Mar. 7, 2020    (IN) ............................. 202011009905

(51) Int. Cl.
*G08B 21/18*    (2006.01)
(52) U.S. Cl.
CPC ................................. *G08B 21/182* (2013.01)

(58) Field of Classification Search
CPC . G08B 21/182; B64F 1/28; B64F 1/20; F21V 23/0457; F21V 25/00; F21W 2111/06; G01M 5/0066; G01H 1/00; G10H 11/08
See application file for complete search history.

(56) References Cited

U.S. PATENT DOCUMENTS

| | | |
|---|---|---|
| 4,534,419 A | 8/1985 | Vural |
| 4,583,966 A | 4/1986 | Ocker et al. |
| 4,740,726 A | 4/1988 | Umezawa |
| 5,034,729 A | 7/1991 | Lundquist |

(Continued)

FOREIGN PATENT DOCUMENTS

| | | |
|---|---|---|
| CN | 107976307 | 5/2018 |
| WO | 2016016604 | 2/2016 |

OTHER PUBLICATIONS

Extended European Search Report for related EP Application No. 21159785.1, dated Jul. 12, 2021 (8 pgs).

(Continued)

*Primary Examiner* — Ojiako K Nwugo
(74) *Attorney, Agent, or Firm* — Brooks, Cameron & Huebsch, PLLC

(57) ABSTRACT

Methods, devices, and systems for airfield luminaire vibration monitoring are described herein. In some examples, one or more embodiments include a computing device comprising a memory and a processor to execute instructions stored in the memory to receive a vibration signal from a sensor on an airfield luminaire, compare the vibration signal from the sensor to a vibration profile for the airfield luminaire, and determine a status of a bolt of the airfield luminaire based on the comparison.

20 Claims, 4 Drawing Sheets

(56) References Cited

U.S. PATENT DOCUMENTS

| | | | |
|---|---|---|---|
| 5,602,757 A | | 2/1997 | Haseley et al. |
| 5,638,057 A | | 6/1997 | Williams |
| 5,703,295 A | | 12/1997 | Ishida et al. |
| 5,926,115 A | | 7/1999 | Schleder et al. |
| 5,945,603 A | * | 8/1999 | Shih .................. G01H 1/00 73/652 |
| 6,297,742 B1 | | 10/2001 | Canada et al. |
| 2012/0319866 A1 | * | 12/2012 | Svoen .................. H04Q 9/00 73/649 |
| 2014/0000373 A1 | * | 1/2014 | Soma' .................. G01M 7/00 73/658 |
| 2014/0096611 A1 | * | 4/2014 | Lysen .................. G01H 1/00 73/649 |
| 2016/0047706 A1 | | 2/2016 | Maruta et al. |
| 2016/0281965 A1 | | 9/2016 | Schneider et al. |
| 2016/0299016 A1 | * | 10/2016 | Campbell ............. G01N 25/00 |
| 2019/0123614 A1 | * | 4/2019 | Fukushima ............. F16F 15/04 |
| 2020/0355565 A1 | | 11/2020 | Kim et al. |
| 2021/0123797 A1 | | 4/2021 | Kiesel et al. |

OTHER PUBLICATIONS

European Communication Pursuant to Article 94(3) EPC for related European Application No. 21159785.1, dated Aug. 31, 2022 (5 pgs).

\* cited by examiner

AIRFIELD LUMINAIRE VIBRATION MONITORING

PRIORITY INFORMATION

This application is a Continuation of U.S. application Ser. No. 17/190,953, filed Mar. 3, 2021, which claims priority to India Patent Application No. 202011009905, filed Mar. 7, 2020, the contents of which are incorporated herein by reference.

TECHNICAL FIELD

The present disclosure relates to methods, devices, and systems for airfield luminaire vibration monitoring.

BACKGROUND

Airfield infrastructure can include terminals, hangars, maintenance facilities, etc. Airfields can further include runways, approach ways, taxiways, and/or intersections therebetween to direct aircraft traffic and/or other vehicles in and/or around the airfield.

Airfields can include lighting systems to provide visual cues and/or signals for an airfield. For example, airfield lighting systems can include luminaires in order to direct aircraft and/or other vehicles in and/or around the airfield. The airfield lighting systems may, in some instances, be mandated by regulatory bodies such as the International Civil Aviation Organization (ICAO) and/or Federal Aviation Administration (FAA), among other examples. Airfield lighting systems can provide safe and efficient way to regulate airfield traffic.

DETAILED DESCRIPTION

Figure 1:
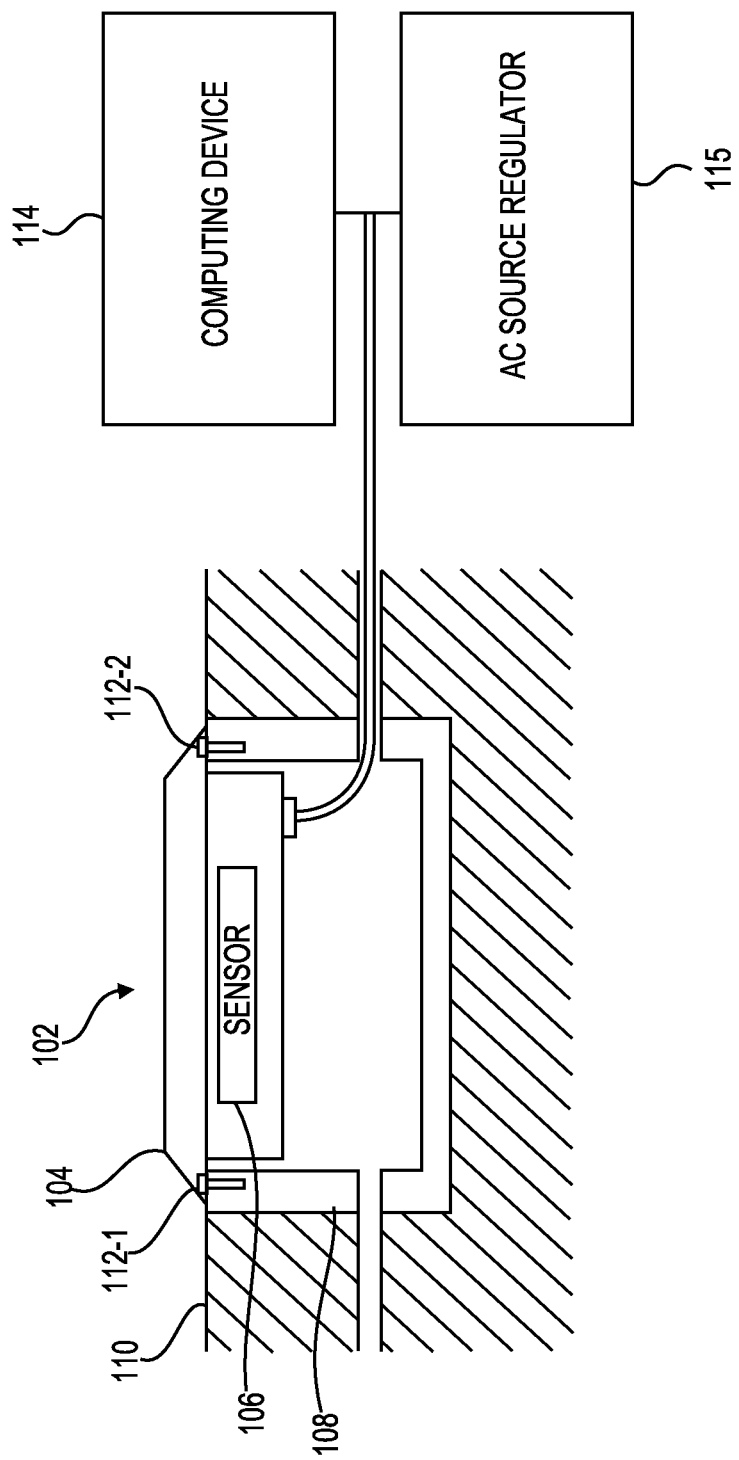
FIG. 1 is an example of an airfield luminaire and a computing device for airfield luminaire vibration monitoring, in accordance with one or more embodiments of the present disclosure.

Methods, devices, and systems for airfield luminaire vibration monitoring are described herein. In some examples, one or more embodiments include a computing device comprising a memory and a processor to execute instructions stored in the memory to receive a vibration signal from a sensor on an airfield luminaire, compare the vibration signal from the sensor to a vibration profile for the airfield luminaire, and determine a status of a bolt of the airfield luminaire based on the comparison.

Airfield luminaires can be located in, above, and/or around an airport surface. As used herein, the term "airfield luminaire" refers to a lighting unit including an electric lamp and associated wiring. For example, airfield luminaires can include halogen and/or light emitting diode (LED) lamps and can be located around approach ways, mounted in the airport surface on runways, taxiways, intersections, etc.

Airfield luminaires can include a housing and can be mounted, via the housing, to a mounting location around the airfield. For example, an airfield luminaire can include a housing that can be connected to a base recessed into the runway, taxiway, intersections, etc. The housing can be connected to the base by bolts.

As airfield luminaires are located around airfields, they may be exposed to forces from shocks and/or vibrations by aircraft landing, taking off, taxiing, etc. For instance, jet blasts from aircraft landing, taking off, and/or taxiing can generate vibrational frequencies that airfield luminaires may be exposed to. Further, vibrations from the weight of aircraft and/or other vehicles can additionally expose airfield luminaires to vibrations.

Exposure to such vibrations can, in some instances, cause the bolts connecting the airfield luminaire housing to its base to loosen. Such loosening of bolts could, in some instances, lead to luminaire housings, bolts, and/or other associated components being debris on an airfield surface. Such debris can be referred to as foreign object debris (FOD). FOD being located on an airport surface may be dangerous to aircraft and/or other vehicles, as FOD can damage aircraft and/or other vehicles transiting an airfield.

Accordingly, maintenance periods can be scheduled to ensure bolts are tightened properly to avoid FOD on an airfield surface. However, airfields may include many airfield luminaires. Maintenance on these luminaires can be time consuming, costly, and expose maintenance personnel to injury. Additionally, flight activities may be temporarily suspended during maintenance on the airfield, creating delays and/or increasing costs for airfields and/or airlines.

Airfield luminaire vibration monitoring, in accordance with the present disclosure, can allow for remote vibration monitoring to determine a bolt status of an airfield luminaire. In such a manner, airfield luminaire vibration monitoring can allow for precise determination of whether a bolt is secure or unsecure, and if unsecure, determination of the associated airfield luminaire and its location on an airfield. Accordingly, airfield luminaires can be individually determined for maintenance, allowing for reduced maintenance time and increased safety for maintenance personnel, allowing for an increase in efficiency of airport operations and reduction in costs as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

FIG. 1 is an example of an airfield luminaire 102 and a computing device 114 for airfield luminaire vibration monitoring, in accordance with one or more embodiments of the present disclosure. The airfield luminaire 102 can include a luminaire housing 104, a sensor 106, a base 108, and bolts 112-1, 112-2. The airfield luminaire 102 can be located in the surface 110 of an airfield and be connected to computing device 114. The airfield luminaire 102 can be connected to an alternating current (AC) source regulator 115.

As illustrated in FIG. 1, the airfield luminaire 102 can include a luminaire housing 104. As used herein, the term "luminaire housing" refers to an enclosed casing and support for a lighting unit. For example, the luminaire housing 104 can include the casing and support for an electric lamp and associated wiring. Although not illustrated in FIG. 1 for clarity and so as not to obscure embodiments of the present disclosure, the luminaire housing 104 can include an electric lamp and an optical window. The electric lamp can emit light through the optical window to provide visual cues and/or signals for an airfield while remaining proximate to the surface 110 of the airfield so as to not be an obstruction to airfield traffic.

The airfield luminaire 102 can include a base 108. As illustrated in FIG. 1, the base 108 can be recessed into the surface 110 of the airfield. For example, the airfield luminaire 102 may be located on a runway of the airfield, and the base 108 can be recessed into the surface (e.g., concrete) of the runway. The base 108 can secure the luminaire housing 104 to the surface 110 of the airfield. For example, the luminaire housing 104 can be received by the base 108.

Bolts 112-1, 112-2 can secure the luminaire housing 104 to the base 108. As used herein, the term "bolt" refers to a movable rod that fastens one item to another. For example, the bolts 112-1, 112-2 can be threaded fasteners that secure the luminaire housing 104 to the base 108. The bolts 112-1, 112-2 can be tightened in order to prevent the luminaire housing 104, bolts 112-1, 112-2, and/or any other components associated with the airfield luminaire 102 from being FOD on the airfield surface 110. However, as described above, vibrations associated with airfield traffic can, in some examples, cause the bolts 112-1, 112-2 to become loose, and the computing device 114 in combination with the sensor 106 can determine whether the bolts 112-1 and/or 112-2 are secure or unsecure, as is further described herein.

As illustrated in FIG. 1, the airfield luminaire 102 can include a sensor 106. As used herein, the term "sensor" refers to a device to detect events in its surrounding environment. For example, the sensor 106 can be a sensor to detect vibrations in its surrounding environment. The sensor 106 can be located on the luminaire housing 104. The sensor 106 can detect vibrations caused by airfield traffic that are experienced by the airfield luminaire 102, as is further described herein.

Although the sensor 106 is described above as being located on the luminaire housing 104, embodiments of the present disclosure are not so limited. For example, the sensor 106 may be located on the base 108, among other locations that may be suitable for detecting vibrations caused by airfield traffic that are experienced by the airfield luminaire 102.

In some examples, the sensor 106 can be a piezoelectric sensor. As used herein, the term "piezoelectric sensor" refers to a sensor that utilizes the piezoelectric effect to measure changes (e.g., pressure, acceleration, strain, force, etc.) in its surrounding environment. For instance, the piezoelectric sensor can detect vibrations caused by airfield traffic that are experienced by the airfield luminaire 102.

In some examples, the sensor 106 can be an accelerometer. As used herein, the term "accelerometer" refers to a sensor that measures the acceleration of a body in its own instantaneous rest frame. For instance, the accelerometer can detect acceleration of the airfield luminaire 102 caused by airfield traffic that can be indicative of vibrations experienced by the airfield luminaire 102.

Although not illustrated in FIG. 1 for clarity and so as not to obscure embodiments of the present disclosure, the airfield luminaire 102 can further include an addressable switch device (ASD). The ASD can transmit identifying information to the computing device 114, as is further described in connection with FIG. 2.

The airfield luminaire 102 can be connected to an AC source regulator 115. As used herein, the term "AC source regulator" refers to a device that varies voltage across a load to maintain a constant electric current. For example, the AC source regulator 115 can maintain a constant current in a range of 2.8 amperes (A) to 6.6 A to regulate luminaire light intensity. Although not illustrated in FIG. 1 for clarity and so as not to obscure embodiments of the present disclosure, the airfield luminaire 102 can be connected to the AC source regulator 115 via a series isolation transformer to prevent any breakage of electrical continuity between the airfield luminaire 102 and the AC source regulator 115 due to an open lamp condition in the airfield luminaire 102, as well as provide for galvanic isolation for safety, as is further described in connection with FIG. 3.

The airfield luminaire 102 can be connected to the computing device 114. The computing device 114 can receive a vibration signal from the sensor 106. For example, in response to vibrations experienced by the airfield luminaire 102 as a result of airfield traffic around the airfield luminaire 102, the sensor 106 can generate a signal and transmit the signal to the computing device 114 for analysis, as is further described herein.

The computing device 114 can analyze a vibration signal received from the sensor 106. As used herein, the term "vibration signal" refers to a signal generated by a sensor in response to detecting a vibration in its surrounding environment. The vibration signal can be generated in response to the sensor 106 experiencing vibrations caused by airfield traffic that are experienced by the airfield luminaire 102.

The vibration signal can be analyzed to determine a frequency corresponding to the vibration signal. To determine the frequency corresponding to the vibration signal, the computing device 114 can transform the vibration signal from the sensor 106 into a frequency domain. For example, the vibration signal received from the sensor 106 can be transformed from discrete time domain data into a frequency domain for analysis.

The vibration signal can be transformed into the frequency domain using a digital Fourier transform. For example, the time domain data included in the vibration signal received from the sensor 106 can be decomposed into constituent frequency data. Utilizing this frequency domain data, frequencies of the vibration experienced by the airfield luminaire 102 can be determined, as is further described herein.

As described above, the airfield luminaire 102 can be subjected to forces by airfield traffic that can cause the airfield luminaire 102 to vibrate. The frequency of such vibrations can be defined by Equation 1:

$$f = \sqrt{\frac{k}{m}} \Big/ 2\pi \qquad \text{Equation 1}$$

where f is the frequency of the vibration experienced by the airfield luminaire 102, k is the spring constant of the airfield luminaire 102, and m is the mass of the airfield luminaire 102.

As illustrated above by Equation 1, the frequency of the vibration experienced by the airfield luminaire 102 can be determined using the mass of the airfield luminaire 102. The mass of the airfield luminaire 102 can include the combined mass of the luminaire housing 104, the sensor 106, the base 108, and the bolts 112-1, 112-2 securing the luminaire housing 104 to the base 108.

The frequency of the vibration experienced by the airfield luminaire 102 can be determined using predetermined spring constant of the airfield luminaire 102. The spring constant of the airfield luminaire 102 can describe the harmonic motion of the airfield luminaire 102 when experiencing a force. For example, the spring constant can describe the combined harmonic motion of the luminaire housing 104, the sensor 106, the base 108, and the bolts 112-1, 112-2.

Utilizing the transformed vibration signal, the computing device 114 can determine the frequency corresponding to the vibration signal utilizing Equation 1. For example, at a particular harmonic, the frequency of the vibration signal may be determined to be 831 Hertz (Hz).

In order to determine whether one of the bolts 112-1, 112-2 is unsecure, the computing device 114 can compare the determined frequency corresponding to the vibration signal to a calibration frequency included in a vibration profile. As used herein, the term "vibration profile" refers to a plurality of calibration frequencies corresponding to the airfield luminaire 102. The plurality of calibration frequencies can each correspond to a particular harmonic. For example, each harmonic can include a corresponding calibrated frequency. The calibrated frequency can be the determined frequency of the airfield luminaire 102 when it is known that both bolts 112-1, 112-2 are secure, as is further described in connection with FIG. 2.

In some examples, the frequency of the vibration signal can be determined to be 1,323 Hz at a first harmonic. The frequency of the vibration signal can be compared to a calibration frequency of 1,389 Hz at the first harmonic included in the vibration profile for the airfield luminaire 102. The comparison can include determining the difference between the determined frequency and the calibration frequency. For example, the computing device 114 can determine the difference between the determined frequency (e.g., 1,323 Hz at the first harmonic) and the calibration frequency (e.g., 1,389 Hz at the first harmonic) to be a difference of 66 Hz.

In some examples, the frequency of the vibration signal can be determined to be 831 Hz at a first harmonic. The frequency of the vibration signal can be compared to a calibration frequency of 1,389 Hz at the first harmonic included in the vibration profile for the airfield luminaire 102. The comparison can include determining the difference between the determined frequency and the calibration frequency. For example, the computing device 114 can determine the difference between the determined frequency (e.g., 831 Hz at the first harmonic) and the calibration frequency (e.g., 1,389 Hz at the first harmonic) to be a difference of 558 Hz.

In some examples, the computing device 114 can determine, in response to the difference between the determined frequency and the calibration frequency of the airfield luminaire 102 being less than a threshold amount, the bolts 112-1, 112-2 to be secure. As described above, the threshold amount can be 100 Hz. The computing device 114 can, in the first example described above, determine the difference between the determined frequency and the calibration frequency of the airfield luminaire 102 to be 66 Hz. Accordingly, the computing device 114 can determine both of the bolts 112-1, 112-2 to be secure. That is, neither of the bolts 112-1, 112-2 are at risk of becoming FOD on the airfield surface 110 when deemed to be in a secure state.

In some examples, the computing device 114 can determine, in response to the difference between the determined frequency and the calibration frequency of the airfield luminaire 102 being greater than a threshold amount, at least one of the bolts 112-1, 112-2 to be unsecure. As described above, the threshold amount can be 100 Hz. The computing device 114 can, in the second example described above, determine the difference between the determined frequency and the calibration frequency of the airfield luminaire 102 to be 558 Hz. Accordingly, the computing device 114 can determine at least one of the bolts 112-1, 112-2 to be unsecure. That is, at least one of the bolts 112-1, 112-2 is at risk of becoming FOD on the airfield surface 110 when deemed to be in an unsecure state.

The computing device 114 can generate an alarm in response to determining the status of at least one of the bolts 112-1, 112-2 to be unsecure. The alarm can be an audible or visual notification, be displayed on a user interface of a display, transmitted to a mobile device, among other examples. The alarm can notify a user that at least one of the bolts 112-1, 112-2 is in an unsecure state and may have to be tightened during a maintenance period.

As previously described above, a vibration profile can include a plurality of calibration frequencies each corresponding to a particular harmonic. For instance, as an aircraft passes by the airfield luminaire 102, the airfield luminaire 102 may experience vibrations across different harmonics (e.g., as the aircraft approaches, is proximate to, and leaves the vicinity of the airfield luminaire 102).

For each harmonic, the airfield luminaire 102 can include a calibration frequency. For example, as described above, the first harmonic can include a calibration frequency of 1,389 Hz. Additionally, a second harmonic can include a calibration frequency of 1,439 Hz, a third harmonic can include a calibration frequency of 1,484 Hz, a fourth harmonic can include a calibration frequency of 2,064 Hz, and a fifth harmonic can include a calibration frequency of 2,171 Hz.

Each vibration signal can be converted to a frequency and compared to a calibration frequency at its corresponding harmonic. For example, a vibration signal at the first harmonic can be converted to a frequency (e.g., 831 Hz) and compared to the calibration frequency (e.g., 1,389 Hz) for the first harmonic to determine a difference of 558 Hz between the two. Additionally, a vibration signal at the second harmonic can be converted to a frequency (e.g., 1,265 Hz) and compared to the calibration frequency (e.g., 1,439 Hz) for the second harmonic to determine a difference of 174 Hz, a vibration signal at the third harmonic can be converted to a frequency (e.g., 1,410 Hz) and compared to the calibration frequency (e.g., 1,484 Hz) for the third harmonic to determine a difference of 74 Hz, a vibration signal at the fourth harmonic can be converted to a frequency (e.g., 1,767 Hz) and compared to the calibration frequency (e.g., 2,064 Hz) for the fourth harmonic to determine a difference of 297 Hz, and a vibration signal at the fifth harmonic can be converted to a frequency (e.g., 2,070 Hz) and compared to the calibration frequency (e.g., 2,171 Hz) for the fifth harmonic to determine a difference of 101 Hz.

In some examples, the computing device 114 can determine the status of the bolt 112-1, 112-2 based on a threshold number of frequency differences being exceeded between the determined frequency and the calibration frequency being greater than a threshold amount. For example, if at least two frequency differences between the determined frequency and the calibration frequency at different harmonics are exceeded, the computing device 114 can determine at least one of the bolts 112-1, 112-2 to be unsecure. For example, the threshold amount can be 100 Hz, and the frequency differences between the determined frequency and the calibration frequency at the first harmonic (e.g., 558 Hz) and the second harmonic (e.g., 174 Hz) both exceed the threshold amount (e.g., at least two harmonics include differences between the determined frequency and the calibration frequency exceed 100 Hz), the computing device 114 can determine the status of at least one of the bolts 112-1, 112-2 to be unsecure.

Although the vibration profile is described above as including five harmonics, embodiments of the present disclosure are not so limited. For example, the vibration profile for the airfield luminaire 102 can include less than five harmonics or more than five harmonics.

Figure 2:
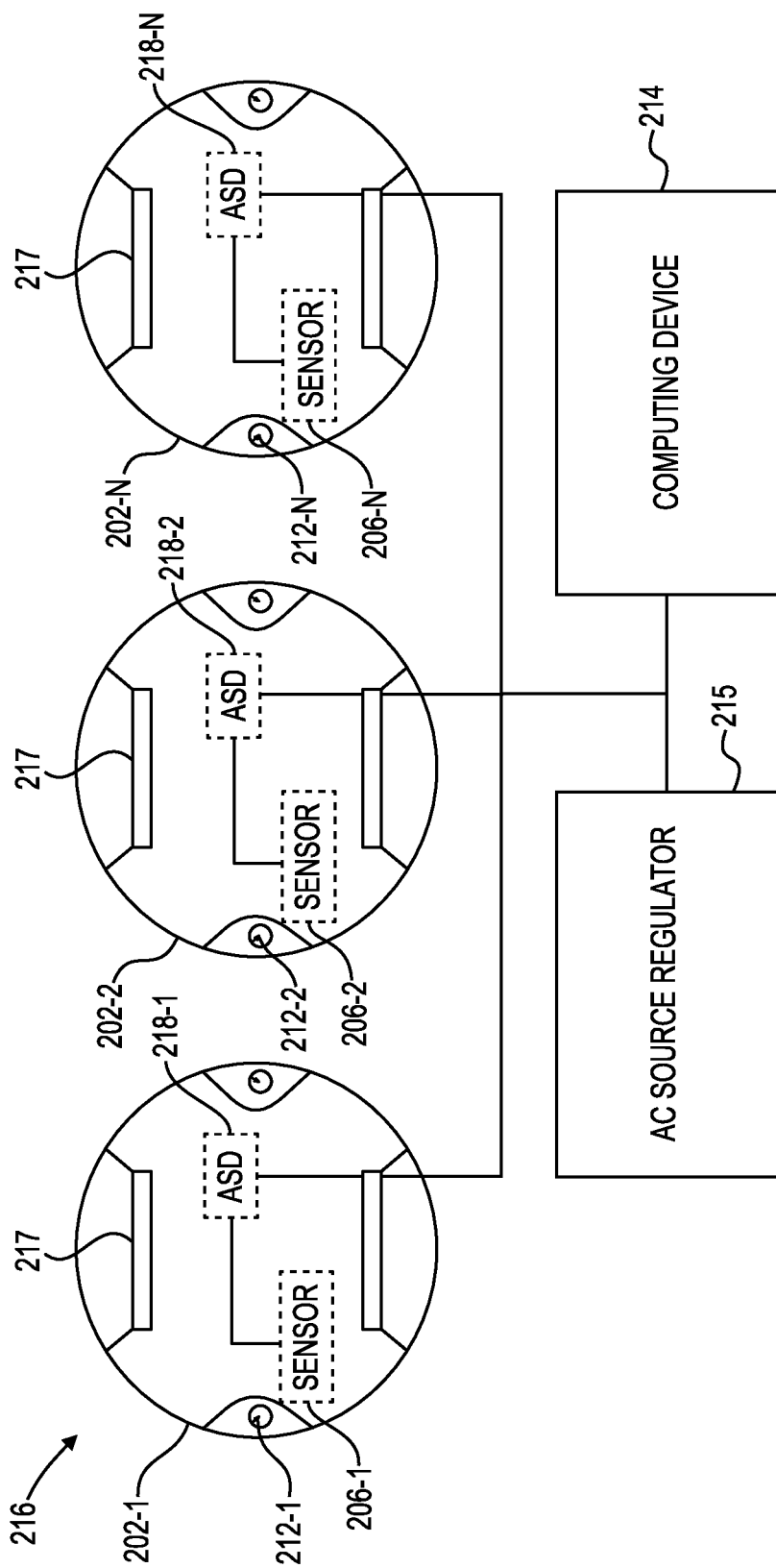
FIG. 2 is an example of a system for airfield luminaire vibration monitoring, in accordance with one or more embodiments of the present disclosure.

FIG. 2 is an example of a system 216 for airfield luminaire vibration monitoring, in accordance with one or more embodiments of the present disclosure. The system 216 can include airfield luminaires 202-1, 202-2, 202-N, optical windows 217, sensors 206-1, 206-2, 206-N, bolts 212-1, 212-2, 212-N, addressable switch devices (ASDs) 218-1, 218-2, 218-N, and computing device 214.

As illustrated in FIG. 2, the system 216 can include a plurality of airfield luminaires 202-1, 202-2, 202-N. The airfield luminaires 202-1, 202-2, 202-N can be located across an airfield and can be utilized to provide visual cues and/or signals for airfield traffic. Each airfield luminaire 202-1, 202-2, 202-N can include optical windows 217. As used herein, the term "optical window" refers to an opening in a housing that allows the passage of light. For example, each of the airfield luminaires 202-1, 202-2, 202-N can include an electric lamp (e.g., not illustrated in FIG. 2 for clarity and so as not to obscure embodiments of the present disclosure) which can emit light through the optical windows 217 to provide visual cues and/or signals for an airfield. In some examples, the optical windows 217 can be a prism.

Each of the airfield luminaires 202-1, 202-2, 202-N can be connected to the AC source regulator 215. The AC source regulator 215 can maintain a constant current in a range of 2.8 amperes (A) to 6.6 A to regulate luminaire light intensity of each of the airfield luminaires 202-1, 202-2, 202-N.

Each of the airfield luminaires 202-1, 202-2, 202-N can be subjected to forces from shocks and/or vibrations from airfield traffic. Accordingly, as previously described in connection with FIG. 1, each airfield luminaire 202-1, 202-2, 202-N can include a corresponding sensor 206-1, 206-2, 206-N to detect the vibrations experienced by the respective airfield luminaires 202-1, 202-2, 202-N.

Each airfield luminaire 202-1, 202-2, 202-N can include an ASD 218-1, 218-2, 218-N. As used herein, the term "ASD" refers to a device for directing electric current and bi-directional communication for an airfield luminaire. For example, the ASD 218-1 can provide switching and bi-directional communication for airfield luminaire 202-1, the ASD 218-2 can provide switching and bi-directional communication for airfield luminaire 202-2, the ASD 218-N can provide switching and bi-directional communication for airfield luminaire 202-N, etc.

Each ASD 218-1, 218-2, 218-N can include a unique identifier. The unique identifier can identify, to the computing device 214, the identity and location of each ASD 218-1 218-2, 218-N, and its corresponding airfield luminaire 202-1, 202-2, 202-N.

Each ASD 218-1, 218-2, 218-N can modulate and/or demodulate a vibration signal from its corresponding sensor 206-1, 206-2, 206-N to the computing device 214. Additionally, each ASD 218-1, 218-2, 218-N can transmit a vibration signal from its corresponding sensor 206-1, 206-2, 206-N to the computing device 214. Each ASD 218-1, 218-2, 218-N can transmit the vibration signal from its corresponding sensor 206-1, 206-2, 206-N to the computing device 214 over pre-existing power cables (e.g., not illustrated in FIG. 2) between the computing device 214 and each ASD 218-1, 218-2, 218-N. For example, the airfield luminaire 202-1 can include sensor 206-1 that detects vibrations experienced by the airfield luminaire 202-1, and the ASD 218-1 can modulate and/or demodulate the vibration signal from the sensor 206-1 and transmit the vibration signal to the computing device 214. Accordingly, the computing device 214 can determine the source of the vibration signal from the ASD (e.g., ASD 218-1) based on the unique identifier of the ASD (e.g., ASD 218-1).

As previously described in connection with FIG. 1, once the computing device 214 receives a vibration signal from an ASD 218-1, 218-2, 218-N of the airfield luminaires 202-1, 202-2, 202-N, the computing device 214 can analyze each signal to determine a frequency, compare the determined frequency to a calibration frequency for the airfield luminaire 202-1, 202-2, 202-N, and determine a status of the bolt 212-1, 212-2, 212-N for the airfield luminaire 202-1, 202-2, 202-N. For example, the ASD 218-1 can transmit a vibration signal to the computing device 214, and the computing device 214 can determine the status of the bolt 212-1 to be secure. As another example, the ASD 218-1 can transmit a vibration signal to the computing device 214, and the computing device 214 can determine the status of the bolt 212-2 to be unsecure. Accordingly, the computing device 214 can generate an alert that can include details that may be relevant for maintenance purposes, such as the identity of the airfield luminaire 202-2, the location of the airfield luminaire 202-2 on the airfield, the status of the bolt 212-2 (e.g., unsecure), among other examples.

As described above, each airfield luminaire 202-1, 202-2, 202-N can include a vibration profile. For example, each airfield luminaire 202-1, 202-2, 202-N can include calibration frequencies corresponding to different harmonics against which frequencies can be compared. Accordingly, a calibration procedure can be performed to determine the calibration frequencies, as is further described herein.

For example, a calibration process can occur when it is known that bolts 212-1, 212-2, 212-N are secure. This may occur after a maintenance process, among other examples. In order to perform a calibration process, the computing device 214 can transmit a command to each sensor 206-1, 206-2, 206-N to record a calibration vibration signal. The calibration vibration signal may be recorded when it is known the airfield luminaire 202-1, 202-2, 202-N may experience forces that cause vibrations to be experienced by the airfield luminaire 202-1, 202-2, 202-N being calibrated.

The computing device 214 can, accordingly, receive the calibration vibration signal from an ASD 218-1, 218-2, 218-N corresponding to the airfield luminaire 202-1, 202-2, 202-N being calibrated, and analyze the calibration vibration signal to determine the calibration frequency. That calibration frequency can then be stored. For example, the airfield luminaire 202-1 can transmit a calibration vibration signal and the computing device 214 can determine the calibration frequency for a first harmonic to be 1,389 Hz. Similarly, the computing device 214 can determine the calibration frequency for a second harmonic for the airfield luminaire 202-1 to be 1,439 Hz, the calibration frequency for a third harmonic for the airfield luminaire 202-1 to be 1,484 Hz, etc. This process can be repeated for all remaining harmonics and for any of the airfield luminaires 202-1, 202-2, 202-N on the airfield.

Airfield luminaire vibration monitoring, in accordance with the present disclosure, can allow for remote monitoring of the status of bolts utilizing vibrational frequencies of vibrations experienced by airfield luminaires. The remote monitoring can allow for determination of whether a bolt of an airfield luminaire is secure or unsecure and, in the event of an unsecure bolt, generate an alarm such that maintenance can occur. Remote determination of unsecure bolts can reduce chances of FOD occurring on an airfield, reduce airfield downtime related to maintenance, and increase safety and efficiency of airport operations.

Figure 3:
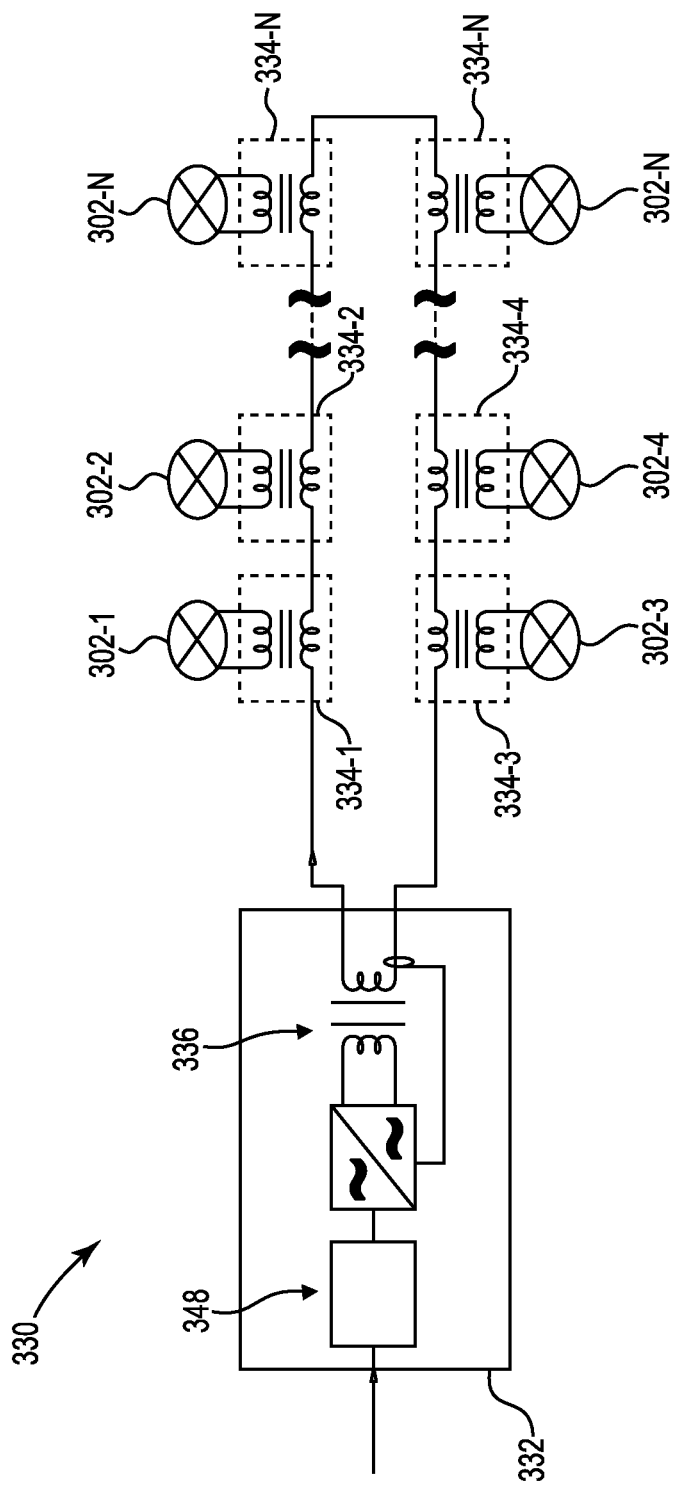
FIG. 3 is an example of an airfield ground lighting circuit for airfield luminaire vibration monitoring, in accordance with one or more embodiments of the present disclosure.

FIG. 3 is an example of an airfield ground lighting circuit 330 for airfield luminaire vibration monitoring, in accordance with one or more embodiments of the present disclosure. The airfield ground lighting circuit 330 can include an AC mains 342, a constant current regulator 332, airfield luminaires 302-1, 302-2, 302-3, 302-4, 302-N, and series isolation transformers 334-1, 334-2, 334-3, 334-4, 334-N. The constant current regulator 332 can include a power transformer 336, an input filter 338, and a feedback control 340.

As illustrated in FIG. 3, the airfield ground lighting circuit 330 can include airfield luminaires 302-1, 302-2, 302-3, 302-4, 302-N. The airfield luminaires 302-1, 302-2, 302-3, 302-4, 302-N can include an electric lamp which can be utilized to direct aircraft and/or other vehicles in and/or around the airfield, as previously described in connection with FIGS. 1 and 2.

The airfield luminaires 302-1, 302-2, 302-3, 302-4, 302-N can be connected to the airfield ground lighting circuit 330 via series isolation transformers 334-1, 334-2, 334-3, 334-4, 334-N, respectively. As used herein, the term "series isolation transformer" refers to a device to transfer electrical power from a power source to a load. For example, the series isolation transformers 334-1, 334-2, 334-3, 334-4, 334-N can transfer electrical power from an AC mains 342 to each of the airfield luminaires 302-1, 302-2, 302-3, 302-4, 302-N, respectively.

As illustrated in FIG. 3, the airfield ground lighting circuit 330 can be connected to an AC mains 342. As used herein, the term "AC mains" refers to a power source to provide power to the airfield ground lighting circuit 330. The AC mains 342 can provide a 50 Hz/60 Hz AC power source in a range of 2.8 A to 6.6 A, although embodiments of the present disclosure are not limited to a 50 Hz/60 Hz AC power source and/or a range of 2.8 A to 6.6 A.

The AC mains 342 can provide power to the airfield ground lighting circuit 330 via the constant current regulator 332. As used herein, the term "constant current regulator" refers to a device to regulate an AC power source. For example, the constant current regulator 332 can regulate current from the AC mains 342 by providing current to the airfield ground lighting circuit 330 in the range of 2.8 A to 6.6 A, as well as provide isolation between the AC mains 342 and the rest of the airfield ground lighting circuit 330 in the event of an electrical power surge.

The constant current regulator 332 can include a power transformer 336. The power transformer 336 can isolate an AC signal (e.g., from the AC mains 342) from the airfield ground lighting circuit 330.

The power transformer 336 can be connected to an input filter 338. The input filter 338 can attenuate rippling that may occur as a result of the operation of the constant current regulator 332.

The constant current regulator 332 can include feedback control 340. The feedback control 340 can include a controller (not illustrated in FIG. 3 for clarity and so as not to obscure embodiments of the present disclosure) that can monitor an input current from the AC mains 342 to keep the input voltage and current of the AC signal in phase.

Figure 4:
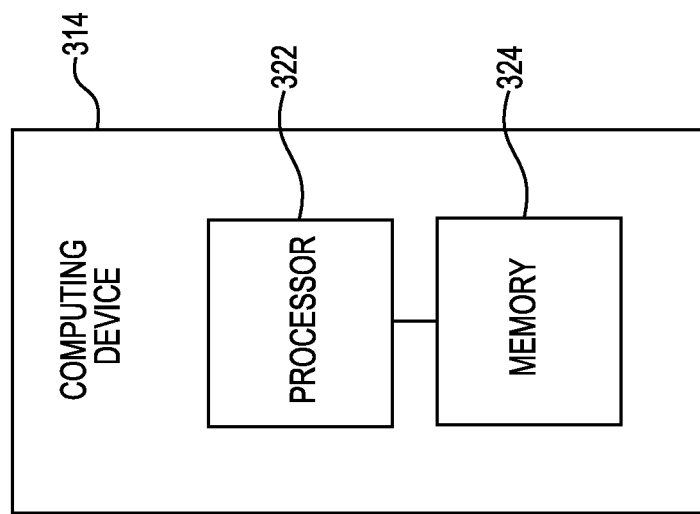
FIG. 4 is an example of a computing device for airfield luminaire vibration monitoring, in accordance with one or more embodiments of the present disclosure.

FIG. 4 is an example of a computing device 414 for airfield luminaire vibration monitoring, in accordance with one or more embodiments of the present disclosure. The computing device 414 can include a processor 422 and a memory 424.

The memory 424 can be any type of storage medium that can be accessed by the processor 422 to perform various examples of the present disclosure. For example, the memory 424 can be a non-transitory computer readable medium having computer readable instructions (e.g., computer program instructions) stored thereon that are executable by the processor 422 for airfield luminaire vibration monitoring in accordance with the present disclosure.

The memory 424 can be volatile or nonvolatile memory. The memory 424 can also be removable (e.g., portable) memory, or non-removable (e.g., internal) memory. For example, the memory 424 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 424 is illustrated as being located within the computing device 414, embodiments of the present disclosure are not so limited. For example, memory 424 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for airfield luminaire vibration monitoring, comprising:
    a memory; and
    a processor configured to execute instructions stored in the memory to:
        determine a frequency corresponding to a vibration signal received from a sensor on an airfield luminaire;
        compare the determined frequency to a calibration frequency included in a vibration profile of the airfield luminaire, wherein the vibration profile includes a plurality of calibration frequencies; and
        determine a status of a fastener of the airfield luminaire based on the comparison.

2. The computing device of claim 1, wherein the plurality of calibration frequencies each correspond to a different harmonic.

3. The computing device of claim 1, wherein the processor is configured to determine the frequency at a particular harmonic.

4. The computing device of claim 3, wherein the calibration frequency corresponds to the particular harmonic.

5. The computing device of claim 1, wherein the processor is configured to execute the instructions to determine the status of the fastener to be secure in response to a difference between the determined frequency and the calibration frequency being less than a threshold amount.

6. The computing device of claim 1, wherein the processor is configured to execute the instructions to determine the status of the fastener to be unsecure in response to a difference between the determined frequency and the calibration frequency being greater than a threshold amount.

7. The computing device of claim 1, wherein the processor is configured to determine the frequency by converting the vibration signal into a frequency domain.

8. The computing device of claim 7, wherein the processor is configured to convert the vibration signal into the frequency domain using a Fourier transform.

9. A non-transitory computer readable medium having computer readable instructions stored thereon that are executable by a processor to:
    determine a frequency corresponding to a vibration signal received from a sensor on an airfield luminaire;
    compare the determined frequency to a calibration frequency included in a vibration profile of the airfield luminaire, wherein the vibration profile includes a plurality of calibration frequencies; and
    determine a status of a fastener of the airfield luminaire based on a difference between the determined frequency and the calibration frequency.

10. The medium of claim 9, wherein the computer readable instructions are executable by the processor to generate an alarm in response to the status of the fastener being unsecure.

11. The medium of claim 9, wherein the computer readable instructions are executable by the processor to transmit a command to the sensor to record a calibration vibration signal.

12. The medium of claim 11, wherein the computer readable instructions are executable by the processor to:
    receive the calibration vibration signal from the sensor; and
    determine an updated calibration frequency based on the calibration vibration signal.

13. The medium of claim 12, wherein the computer readable instructions are executable by the processor to store the updated calibration frequency in the vibration profile as the calibration frequency for the airfield luminaire.

14. The medium of claim 9, wherein the computer readable instructions are executable by the processor to determine the frequency using:
    a mass of the airfield luminaire; and
    a predetermined spring constant of the airfield luminaire.

15. A system for airfield luminaire vibration monitoring, comprising:
    an airfield luminaire, wherein the airfield luminaire includes:
        a sensor; and
        a fastener to secure the airfield luminaire;
    a computing device configured to:
        determine a frequency corresponding to a vibration signal received from the sensor;
        compare the determined frequency to a calibration frequency included in a vibration profile of the airfield luminaire, wherein the vibration profile includes a plurality of calibration frequencies; and
        determine whether the fastener of the airfield luminaire is unsecure based on the comparison.

16. The system of claim 15, wherein the airfield luminaire includes an addressable switch device (ASD) configured to modulate the vibration signal from the sensor.

17. The system of claim 16, wherein the ASD is further configured to transmit the modulated vibration signal to the computing device.

18. The system of claim 15, wherein the system further includes a mobile device having a user interface and an audio output device.

19. The system of claim 18, wherein the computing device is configured to generate and transmit an alert to the mobile device in response to the fastener being determined to be unsecure.

20. The system of claim 19, wherein the mobile device is configured to at least one of:
    display the alert on the user interface; and emit an audible notification of the alarm using the audio output device.

\* \* \* \* \*